United States Patent
Liang et al.

(10) Patent No.: US 9,640,210 B1
(45) Date of Patent: May 2, 2017

(54) VIRTUAL WINDOW MODE FOR GUIDE SPIRAL SERVO DEMODULATION

(71) Applicant: KABUSHIKI KAISHA TOSHIBA, Tokyo (JP)

(72) Inventors: Jiangang Liang, San Jose, CA (US); Gabor Szita, Mountain View, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/941,375

(22) Filed: Nov. 13, 2015

(51) Int. Cl.
*G11B 5/596* (2006.01)

(52) U.S. Cl.
CPC ...... *G11B 5/59666* (2013.01); *G11B 5/59661* (2013.01); *G11B 5/59688* (2013.01)

(58) Field of Classification Search
CPC ........ G11B 5/59633; G11B 5/59661–5/59666; G11B 5/59688
USPC .................. 360/69, 75, 77.01–77.08, 78.01, 360/78.04–78.07
See application file for complete search history.

(56) References Cited

U.S. PATENT DOCUMENTS

| | | | |
|---|---|---|---|
| 6,985,316 B1 | 1/2006 | Liikanen et al. | |
| 7,149,048 B1 | 12/2006 | Ray et al. | |
| 7,230,786 B1 | 6/2007 | Ray et al. | |
| 7,333,280 B1 * | 2/2008 | Lifchits .................. | G11B 5/596 360/75 |
| 7,391,584 B1 * | 6/2008 | Sheh .................. | G11B 5/59627 360/75 |
| 7,502,195 B1 * | 3/2009 | Wu ..................... | G11B 5/59627 360/75 |
| 7,639,446 B2 * | 12/2009 | Mizukoshi ......... | G11B 5/59633 360/75 |
| 7,859,782 B1 * | 12/2010 | Lee ..................... | G11B 5/59633 360/51 |
| 7,990,646 B2 | 8/2011 | Rigney | |
| 8,184,392 B1 * | 5/2012 | Cheung .............. | G11B 5/59633 360/75 |
| 8,400,727 B2 * | 3/2013 | Yoshida ............. | G11B 5/59666 360/75 |
| 8,432,629 B1 * | 4/2013 | Rigney .............. | G11B 5/59661 360/75 |
| 8,451,697 B1 * | 5/2013 | Rigney .............. | G11B 5/59633 369/44.28 |
| 8,724,253 B1 * | 5/2014 | Liang ................. | G11B 5/59627 360/75 |
| 8,891,191 B1 * | 11/2014 | Park ................. | G11B 20/10222 360/77.04 |

* cited by examiner

*Primary Examiner* — Wayne Young
*Assistant Examiner* — James L Habermehl
(74) *Attorney, Agent, or Firm* — Patterson & Sheridan, LLP

(57) ABSTRACT

A write head is positioned over a disk surface of a hard disk drive during a self-servo write process. A virtual window mode is employed for positioning the write head, in which the read channel of the hard disk drive continuously searches for servo spirals, but spiral detection is disabled except during specific time intervals, or "virtual windows." Each virtual window is associated with one specific servo spiral on the disk surface, and has a predetermined duration. The duration and timing of these virtual windows may be selected to ensure that spiral detection is enabled while a read head of the hard disk drive passes over the associated servo spiral, even when servo spiral placement is not ideal.

18 Claims, 12 Drawing Sheets

VIRTUAL WINDOW MODE FOR GUIDE SPIRAL SERVO DEMODULATION

BACKGROUND

In a typical hard disk drive (HDD), servo sectors on a disk are used to provide position information about the location of a magnetic head over a disk surface. A common approach for writing such servo information on each disk surface on an HDD is referred to as spiral-based self-servo writing, or spiral-based SSW. According to this approach, spiral-shaped servo information (or "servo spirals") is written on at least one disk surface prior to the SSW process.

Generally, each servo spiral is written on a disk surface to include a constant high-frequency pattern interrupted by synchronization marks that provide timing and location information to the servo system of the HDD during an SSW process. When a write head performs spiral-based SSW, the final servo information on a disk surface is written by the write head, and the position of the write head relative to the disk surface is controlled based on such servo spirals. Typically, spiral search mode is employed to demodulate the signal generated by a read head crossing the servo spirals and extract the necessary timing and location information.

In the spiral search mode, the read channel of a magnetic head is continuously seeking valid spiral crossing signals via peak detection circuitry. Thus, even when a servo spiral is offset from its expected location, the read channel can still detect the signal corresponding to the spiral crossing. However, such peak detection circuitry is not 100% accurate, because for each servo spiral, there is generally a small chance the detection circuitry will fail to detect the servo spiral or falsely determine that stray signals on the disk surface are the servo spiral. Such failures to detect and false detections typically lead to a failure of the drive, requiring the drive to be reworked or discarded.

SUMMARY

One or more embodiments provide systems and methods for positioning a write head over a disk surface of a hard disk drive during a self-servo write process. Specifically, a virtual window mode is employed for positioning the write head, in which the read channel of the hard disk drive continuously searches for servo spirals, but spiral detection is disabled except during specific time intervals, or "virtual windows." Each virtual window is associated with one specific servo spiral on the disk surface, and has a predetermined duration. The duration and timing of these virtual windows may be selected to ensure that spiral detection is enabled while a read head of the hard disk drive passes over the associated servo spiral, even when servo spiral placement is not ideal. Since spiral detection is only enabled in the vicinity of the predicted location of each servo spiral, stray signals on the disk surface are much less likely to be falsely interpreted by the read channel as a servo spiral. Furthermore, if a spiral is not detected during a virtual window, exception handling can be initiated, thereby preventing catastrophic failure of the drive during the self-servo write process.

A method of positioning a write head based on position signals generated by a read head as the read head crosses a plurality of reference spirals, including first and second spirals that are adjacent, according to an embodiment, comprises, after the read head crosses the first spiral and prior to the read head crossing the second spiral, disabling spiral detection; after disabling the spiral detection and prior to the read head crossing the second spiral, enabling the spiral detection; determining a radial position of the write head by demodulating a position signal generated by the read head as the read head crosses the second spiral while the spiral detection is enabled; after the read head crosses the second spiral, disabling the spiral detection; and based on the determined radial position, adjusting a radial velocity of the write head.

A data storage device, according to another embodiment, comprises a rotatable disk with a writable surface, and a controller. The controller is configured to position a write head based on position signals generated by a read head as the read head crosses a plurality of reference spirals, including first and second spirals that are adjacent by, after the read head crosses the first spiral and prior to the read head crossing the second spiral, disabling spiral detection; after disabling the spiral detection and prior to the read head crossing the second spiral, enabling the spiral detection; determining a radial position of the write head by demodulating a position signal generated by the read head as the read head crosses the second spiral while the spiral detection is enabled; after the read head crosses the second spiral, disabling the spiral detection; and, based on the determined radial position, adjusting a radial velocity of the write head.

A method of manufacturing a hard disk drive, according to another embodiment, comprises incorporating a storage disk in a housing of the hard disk drive; forming a plurality of reference spirals, including first and second spirals that are adjacent, on a surface of the storage disk; and positioning a write head based on position signals generated by a read head as the read head crosses the plurality of reference spirals. According to the method, the write head is positioned by, after the read head crosses the first spiral and prior to the read head crossing the second spiral, disabling spiral detection; after disabling the spiral detection and prior to the read head crossing the second spiral, enabling the spiral detection; determining a radial position of the write head by demodulating a position signal generated by the read head as the read head crosses the second spiral while the spiral detection is enabled; after the read head crosses the second spiral, disabling the spiral detection; and, based on the determined radial position, adjusting a radial velocity of the write head.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
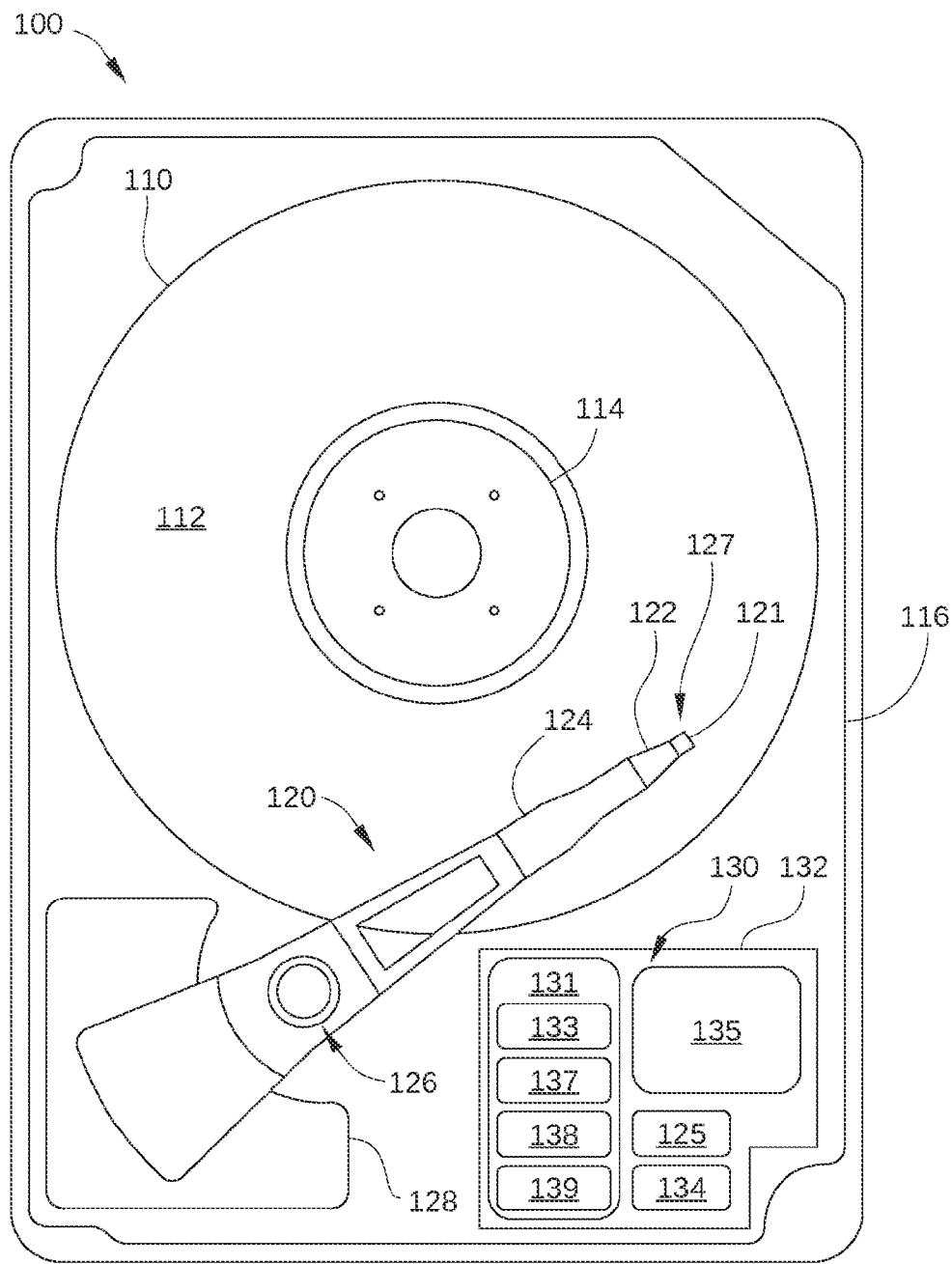
FIG. 1 is a schematic view of an exemplary hard disk drive, according to one embodiment.

FIG. 1 is a schematic view of an exemplary hard disk drive, according to one embodiment. For clarity, hard disk drive (HDD) 100 is illustrated without a top cover. HDD 100 includes at least one storage disk 110 that is rotated by a spindle motor 114 and includes a plurality of concentric data storage tracks are disposed on a surface 112 of storage disk 110. Spindle motor 114 is mounted on a base plate 116. An actuator arm assembly 120 is also mounted on base plate 116, and has a slider 121 mounted on a flexure arm 122 with a magnetic read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a processor 133, a read/write channel 137, a servo controller 138, a high-speed random-access memory (RAM) 139, and a memory 134 (which may be a dynamic RAM and is used as a data buffer). In some embodiments, processor 133, read/write channel 137, and servo controller 138, and/or high-speed RAM 139 may be included in a single chip, such as a system-on-chip 131. In some embodiments, HDD 100 may further include a motor-driver chip 125 that accepts commands from processor 133 and drives both spindle motor 114 and voice coil motor 128. In some embodiments, electronic circuits 130 may include a flash memory device 135 as an additional mass storage device, such as when HDD 100 is configured as a hybrid drive.

Processor 133 is generally configured to operate as a disk controller for formatting and providing error detection and correction of disk data, a host interface controller for responding to commands from a host external to HDD 100, and a buffer controller for storing data that are transferred between HDD 100 and the external host. Read/write channel 137 includes an electronic circuit that transforms into bits the physical magnetic flux changes that occur as read/write head 127 passes over storage disk 110. In addition, read/write channel 137 communicates with read/write head 127 via a preamplifier (not shown) that may be mounted on a flex-cable that is itself mounted on base plate 116, actuator arm 120, or both. Servo controller 138 is an electronic circuit that operates as an interface between processor 133 and the mechanical components of HDD 100, which include storage disk 110, spindle motor 114, actuator arm assembly 120, and voice coil motor 128. Thus, processor 133 may issue commands to servo controller 138 for positioning actuator arm assembly 120 and read/write head 127 using voice coil motor 128 and for precisely controlling the rotation of spindle motor 114 to rotate storage disk 110.

High-speed RAM 139 stores data received from read/write channel 137 that is used by servo controller 138, such as servo data read from servo spirals or servo wedges by read/write channel 137. To reduce latency in the servo system of HDD 100, high-speed RAM 139 may be configured as static RAM (SRAM), which is significantly faster than dynamic RAM (DRAM). Memory 134 is generally configured to operate as a memory for processor 133, a data buffer for storing data that are transferred between HDD 100 and an external host, and as a data cache for processor 133. In contrast to high-speed RAM 139, memory 134 typically includes DRAM and little or no SRAM.

For clarity, HDD 100 is illustrated with a single storage disk 110 and a single actuator arm assembly 120. HDD 100 typically includes multiple storage disks and multiple actuator arm assemblies. In addition, each side of storage disk 110 typically has a corresponding read/write head associated therewith and coupled to a flexure arm.

When data are transferred to or from storage disk 110, actuator arm assembly 120 sweeps an arc between the ID and the OD of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. A servo system for HDD 100 that includes read/write head 127, read/write channel 137, servo controller 138, and high-speed RAM 139 uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry. Operation of the servo system for HDD 100 is described in greater detail below in conjunction with FIG. 3.

In order for HDD 100 to perform SSW and write the final product servo wedges on storage disk 110 with the necessary precision for proper operation of HDD 100, position and timing information are provided to the disk drive servo system of HDD 100. The position and timing information that enable the internal servo system of HDD 100 to perform SSW is typically in the form of reference spiral tracks or "servo spirals" written on storage disk 110. One embodiment of such servo spirals is illustrated in FIG. 2.

Figure 2:
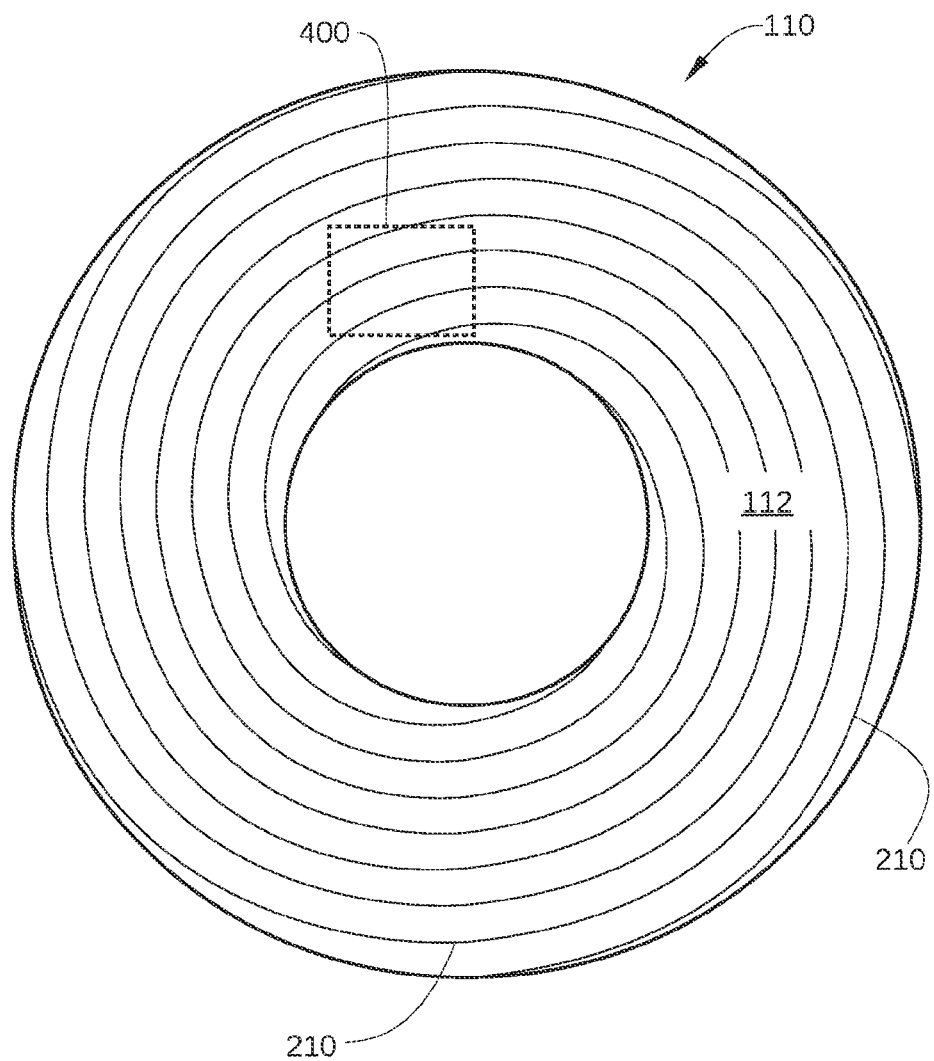
FIG. 2 illustrates a storage disk of the hard disk drive of FIG. 1 prior to undergoing a servo self-write process, according to one embodiment.

FIG. 2 illustrates storage disk 110 prior to undergoing a SSW process, according to one embodiment. As shown, storage disk 110 has a plurality of reference spirals 210 written thereon that are circumferentially spaced from adjacent reference spirals 210. Reference spirals 210 may be written onto a substantially blank surface 112 of storage disk 110 using read/write head 127 and the servo system of HDD 100 with a boot-strap spiral-writing process, with an external media writer before assembly of HDD 100, or with a servo writing machine that uses an external precision actuator to position the disk drive actuator. Reference spirals 210 enable the generation of servo wedges on storage disk 110 using closed-loop control in the servo system of HDD 100. That is, servo wedges can be written while the servo system of HDD 100 uses closed-loop tracking of the coarse guide spirals. It is noted that the number of reference spirals 210 written on storage disk 110 is generally larger than that shown in FIG. 2, for example as few as ten or twenty, or as many as several hundred.

During the SSW process, the servo system of HDD 100 uses the timing and position information provided by the above-described reference spirals 210 to servo precisely over a radial position on storage disk 110 corresponding to a particular concentric data storage track. Thus, while the read head of read/write head 127 is used to read position and timing information from reference spirals 210, the write head of read/write head 127 is used to write servo wedges for a radial position on storage disk 110, i.e., for a particular data storage track of storage disk 110.

Figure 3:
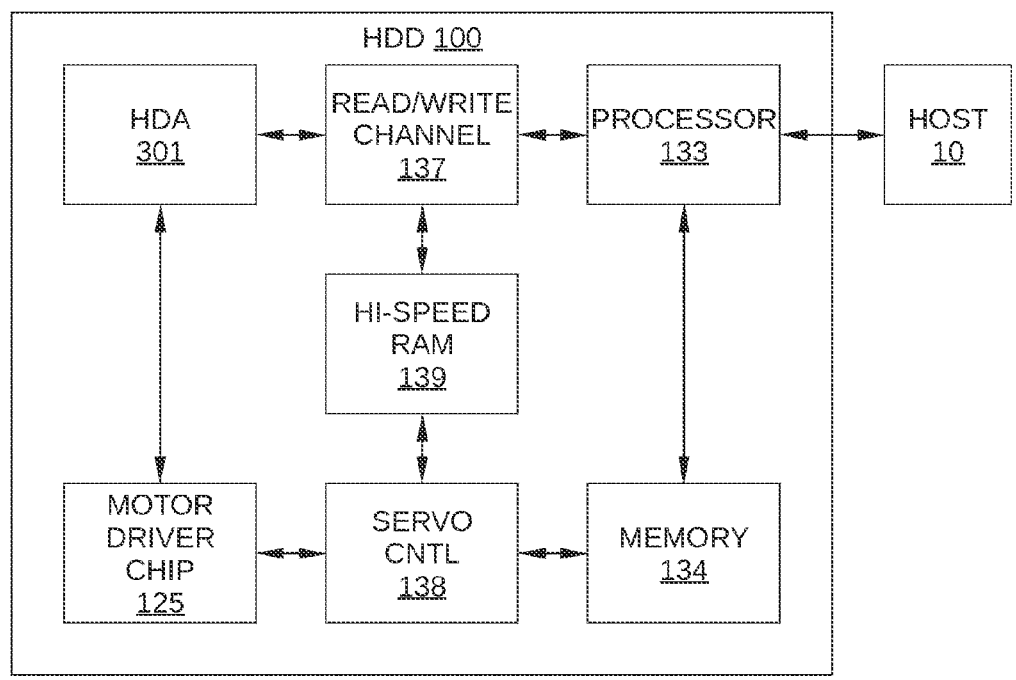
FIG. 3 illustrates an operational diagram of the hard disk drive of FIG. 1, according to one embodiment.

FIG. 3 illustrates an operational diagram of HDD 100, according to one embodiment. As shown, HDD 100 is connected to an external host 10, and includes the above-described processor 133, read/write channel 137, servo controller 138, high-speed RAM 139, memory 134, and motor-driver chip 125. HDD 100 also includes a head-disk assembly (HDA) 301, which includes the mechanical components of HDD 100, i.e., storage disk 110, spindle motor 114, actuator arm assembly 120, and voice coil motor 128. During an SSW process, timing and position data (represented, for example, by a high frequency signal punctuated with regularly spaced synch marks) are read by read/write head 127 from servo spirals 210 formed on storage disk 110, and then stored in high-speed RAM 138. According to some embodiments, the servo system of HDD 100 may detect servo spiral crossings in either of two modes during the SSW process: windowed spiral demodulation mode or virtual window demodulation mode, which is similar to continuous spiral demodulation.

In windowed spiral demodulation mode, read/write channel 137 attempts to detect servo spirals only during predetermined time periods, or demodulation windows, where the duration of each demodulation window is generally limited by the size of high-speed RAM 139. In general, high-speed RAM 139 is typically sized to store data generated during a time period having a duration of a small number of frames, where a frame corresponds to the time interval between two adjacent synch marks embedded in a servo spiral. For example, high-speed RAM 139 may be sized to have sufficient capacity to store data generated over approximately 32 frames, whereas for comparison the number of frames encountered when read/write head 127 crosses a servo spiral is on the order of about three to twenty frames, depending on the references spiral's slope and the spiral write seek velocity. During each such demodulation window, any data generated by read/write channel 137 are stored in high-speed RAM 139 and analyzed for position and timing information associated with a servo spiral. If a servo spiral crossing is detected, read/write channel 137 sends the position and timing information stored in high-speed RAM 139 to servo controller 138 for determining the current position of read/write head 127.

Because the size of high-speed RAM 139 is generally limited due to cost and power constraints, the duration of such demodulation windows in windowed spiral demodulation mode is relatively short. Therefore, accurate knowledge of the location of each of servo spirals 210 is preferred to avoid servo spiral mis-detection, which is the failure to detect a servo spiral because the demodulation window for the servo spiral does not overlap the time at which read/write head 127 passes over the servo spiral. Windowed spiral demodulation mode is typically employed after some sort of search mode has been used to determine servo spiral positions, e.g., virtual window demodulation mode, and servo controller 138 has locked onto the servo spirals.

In some embodiments, virtual window demodulation mode is used to search for the spiral crossings when the precise locations of each of servo spirals 210 is unknown, for example at the beginning of an SSW process. In virtual window demodulation mode, read/write channel 137 continuously sends any data generated by read/write channel 137 to high-speed RAM 139. In addition, read/write channel 137 is configured to determine if a servo spiral has been crossed by analyzing data generated by read/write channel 137. If a servo spiral crossing is detected, read/write channel 137 sends the position and timing information currently stored in high-speed RAM 139 to servo controller 138 for determining the current position of read/write head 127. In contrast to windowed spiral demodulation mode, when the servo system of HDD 100 is in virtual window demodulation mode, read/write channel 137 continues to send data generated by read/write channel 137 to high-speed RAM 139, even after high-speed RAM 139 is filled with data. Thus, previously stored data in high-speed RAM 139 are constantly overwritten in virtual window demodulation mode. For example, high-speed RAM 139 may be configured as a circular buffer, so that the oldest data entries are overwritten first. Consequently, in virtual window mode high-speed RAM 139 retains the most recently received data generated by read/write channel 137, and is continuously updated with new data generated by read/write channel 137.

According to some embodiments, spiral detection is disabled in virtual window mode except during specific time intervals, or "virtual windows." Each virtual window is associated with one specific servo spiral on the disk surface, and has a predetermined duration. The timing of each virtual window may be selected to coincide with the time at which a read element of read/write head 127 passes over the ideal location of the associated servo spiral. However, unlike the duration of demodulation windows employed in windowed spiral demodulation mode, the duration of the virtual windows employed in virtual window demodulation mode are not limited by the size of high-speed RAM 139. Instead, the duration of such virtual windows can be of an arbitrary length, and can even vary for each reference spiral 210 or for different portions of each reference spiral 210. Thus, the duration of such virtual windows can be selected to ensure that spiral detection is enabled while a read element of read/write head 127 passes over the associated servo spiral, even when servo spiral placement is not ideal. The timing of such virtual windows with respect to servo crossings is now described.

Figure 4:
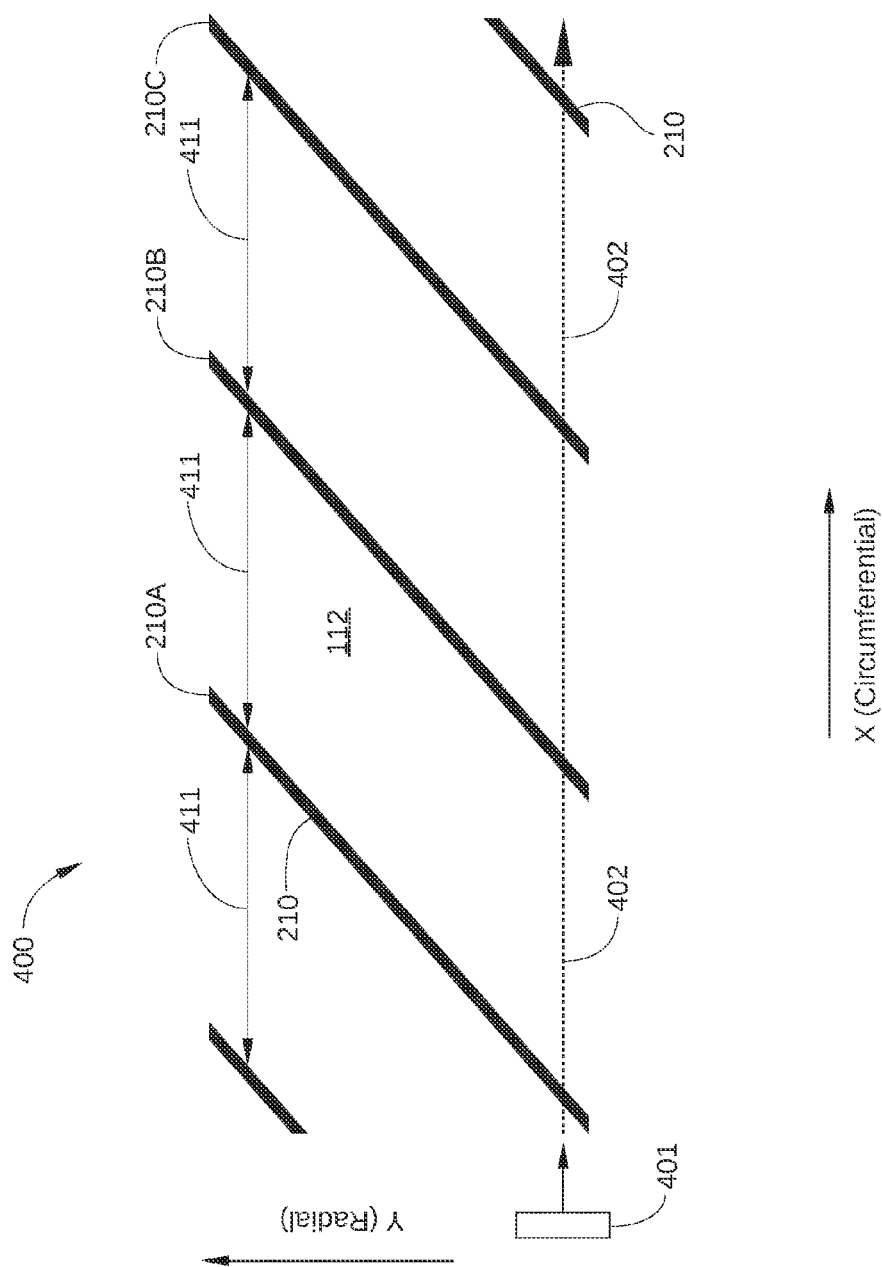
FIG. 4 is a schematic illustration of a portion of a storage disk indicated in FIG. 2 prior to undergoing a servo self-write process, according to one embodiment.

FIG. 4 is a schematic illustration of a portion 400 of storage disk 110 indicated in FIG. 2 prior to undergoing an SSW process. As shown, a plurality of reference spirals 210, including reference spirals 210A-210C, are formed on storage disk 110, and a read element 401 of read/write head 127 passes over each reference spiral 210 as storage disk 110 rotates. Displacement along the x-axis in FIG. 4 indicates angular displacement, such as radians or degrees, and displacement along the y-axis in FIG. 4 indicates radial linear displacement. Ideally, in a bootstrap spiral-writing process, read/write head 127 writes each of reference spirals 210 on a blank surface of storage disk 110 using the same radial velocity profile. Assuming this ideal case, for any particular radial location on storage disk 110, reference spirals 210 are circumferentially separated from each other by a substantially uniform angular separation 411, and reference spirals 210 can be depicted as parallel lines as shown in FIG. 4. Thus, given uniform angular separation 411 between reference spirals 210 (and assuming a constant rotational velocity for storage disk 110), when read element 401 is positioned at any particular radial location, a time required for read/write head 127 to travel from one to another of reference spirals 210 is a known, constant time interval, and the timing of read/write head 127 passing over each reference spiral 210 can be accurately predicted.

In practice, due to factors that affect the precise positioning of a write head while reference spirals 210 are being written on storage disk 110, such as mechanical vibration, disk flutter, and the like, reference spirals 210 are generally neither parallel to each other nor uniformly spaced from each other. Because each of reference spirals 210 is generally not separated from adjacent reference spirals 210 by uniform angular separation 411, the time required for read element 401 to travel from one to another of reference spirals 210 varies between each pair of adjacent reference spirals, as illustrated in FIG. 5.

Figure 5:
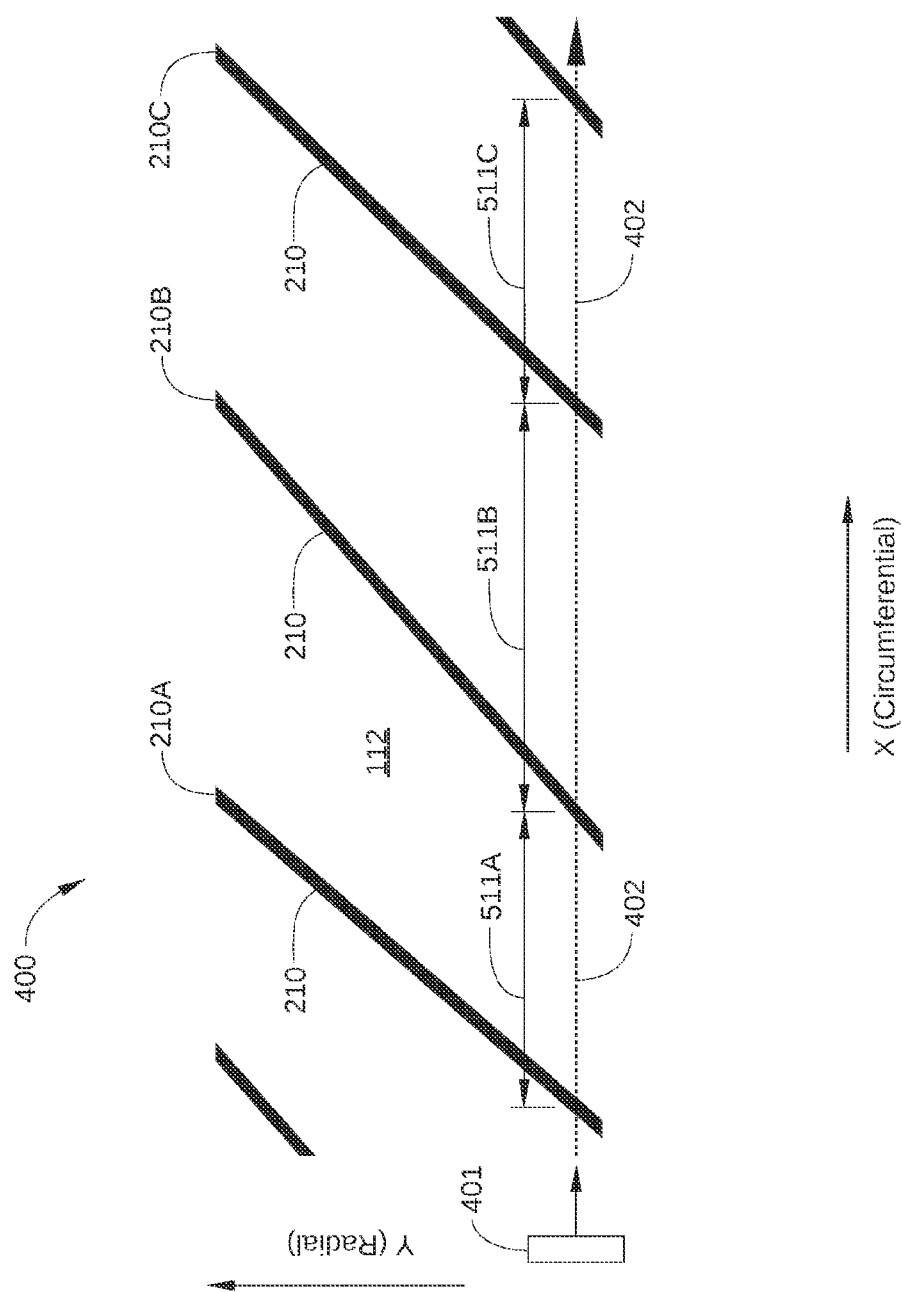
FIG. 5 is a schematic illustration of the portion of the storage disk indicated in FIG. 2 prior to undergoing an SSW process, where reference spirals are not ideally formed.

FIG. 5 is a schematic illustration of portion 400 of storage disk 110 prior to undergoing an SSW process, where reference spirals 210 are not ideally formed. Similar to FIG. 4, reference spirals 210A-210C are formed on storage disk 110, displacement along the x-axis in FIG. 5 indicates circumferential angular displacement, and displacement along the y-axis in FIG. 5 indicates radial linear displacement. Unlike the ideally formed reference spirals 210 in FIG. 4, in FIG. 5 reference spirals 210 are generally not circumferentially separated from each other at a particular radial location by a substantially uniform distance. Instead, due to unique variations in the shape of each reference spiral 210A-210C, at any particular radial location on storage disk 110, reference spirals 210A-210C are separated by non-ideal circumferential distances 511A-511C as shown. That is, each of non-ideal circumferential distances 511A-511C may vary relative to the other non-ideal circumferential distances 511A-511C. For example, at radial location 402, reference spirals 210A and 210B are separated by non-ideal circumferential distance 511A, which is significantly less than non-ideal circumferential distance 511B separating reference spirals 210B and 210C.

The presence of non-ideal circumferential distances 511A-511C between reference spirals 210A-210C can make the precise time at which read element 401 crosses a particular reference spiral unpredictable during an SSW process. Specifically, the actual time that read element 401 crosses a particular reference spiral can vary significantly from the nominal time (based on ideal servo spiral placement) that read element 401 crosses a particular reference spiral. Therefore, use of the above-described windowed spiral demodulation mode can result in a large number of spiral mis-detections, as illustrated in FIG. 6.

Figure 6:
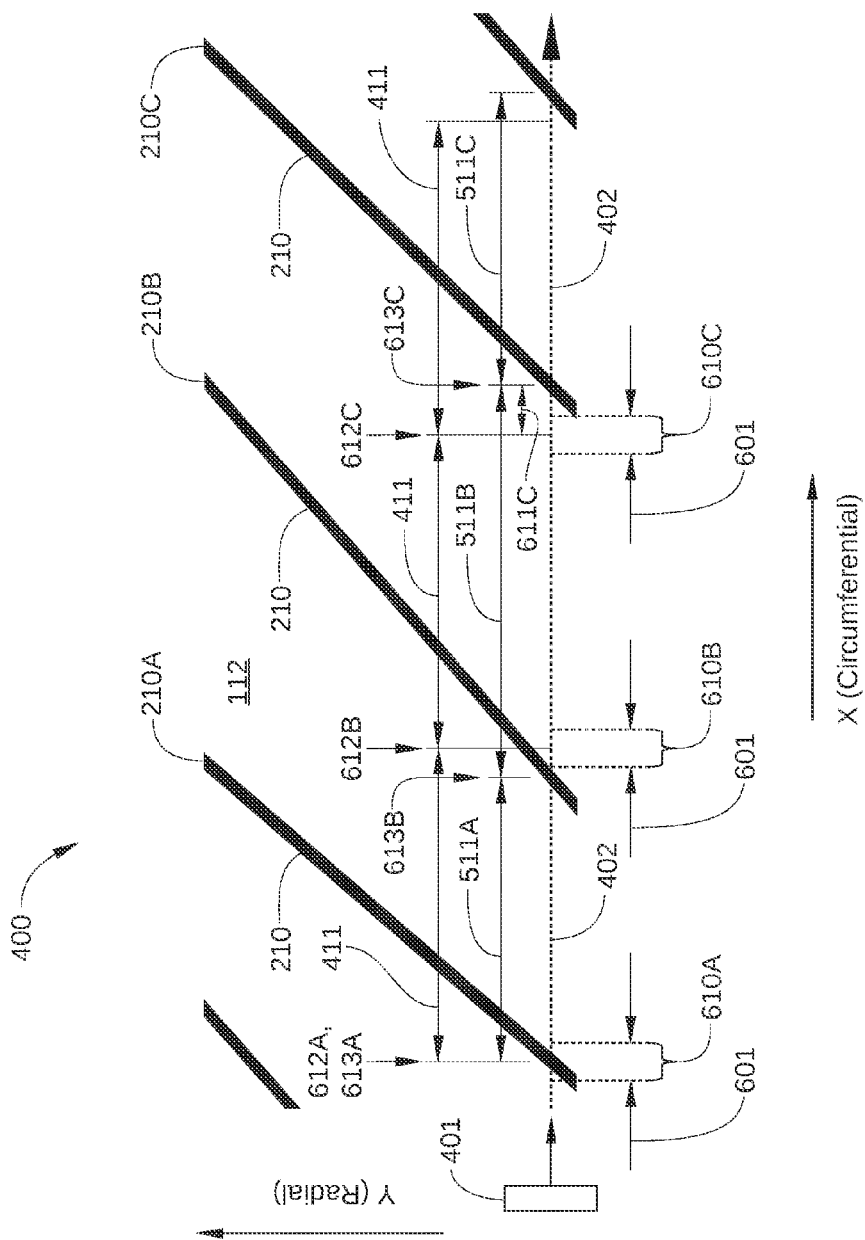
FIG. 6 is a schematic illustration of the portion of the storage disk indicated in FIG. 2 prior to undergoing an SSW process, where reference spirals are not ideally formed.

FIG. 6 is a schematic illustration of portion 400 of storage disk 110 prior to undergoing an SSW process, where reference spirals 210 are not ideally formed. Also shown in FIG. 6 for reference are uniform angular separations 411 and demodulation windows 610A-610C. Uniform angular separations 411 indicate the ideal separation between reference spirals 210 at radial location 402, and ideal spiral locations 612A-612C are defined by uniform angular separations 411. For purposes of illustration, demodulation windows 610A-610C are aligned with ideal spiral locations 612A-612C, respectively.

Each of demodulation windows 610A-610C graphically depicts a time interval during which read/write channel 137 of HDD 100 monitors signals generated by read element 401 when in windowed spiral demodulation mode. Each of demodulation windows 610A-610C is shown in FIG. 6 timed to coincide with the nominal time that read element 401 crosses an associated reference spiral 210. Thus, demodulation window 610A is timed to coincide with the time that read element 401 crosses ideal spiral location 612A, demodulation window 610B is timed to coincide with the time that read element 401 crosses ideal spiral location 612B, and demodulation window 610C is timed to coincide with the time that read element 401 crosses ideal spiral location 612C.

In general, the duration of each demodulation window 610A-610C is equal to or less than a time interval required for data generated by read/write head 127 to fill high-speed RAM with data, for example a time period equal to 32 frames passing under read/write head 127. As shown, such a time period corresponds to a circumferential distance 601 that is short relative to the circumferential offset (along radial location 402) that can occur between ideal spiral locations 612A-612C and actual spiral locations 613A-613C. For example, a circumferential offset 611C between ideal spiral location 612C and actual spiral location 613C results in actual spiral location 613C being disposed outside demodulation window 610C. Similarly, a circumferential offset (not labeled for clarity) between ideal spiral location 612B and actual spiral location 613B results in actual spiral location 613B being disposed outside demodulation window 610B. In light of the above, spiral mis-detections will frequently occur if windowed spiral demodulation mode when actual spiral locations 613A-613C for servo spirals 210A-210C are unknown and vary significantly from ideal spiral locations 612A-612C. According to some embodiments, the servo system of HDD 100 can operate in virtual window mode instead, thereby preventing such spiral mis-detections, as illustrated in FIG. 7.

Figure 7:
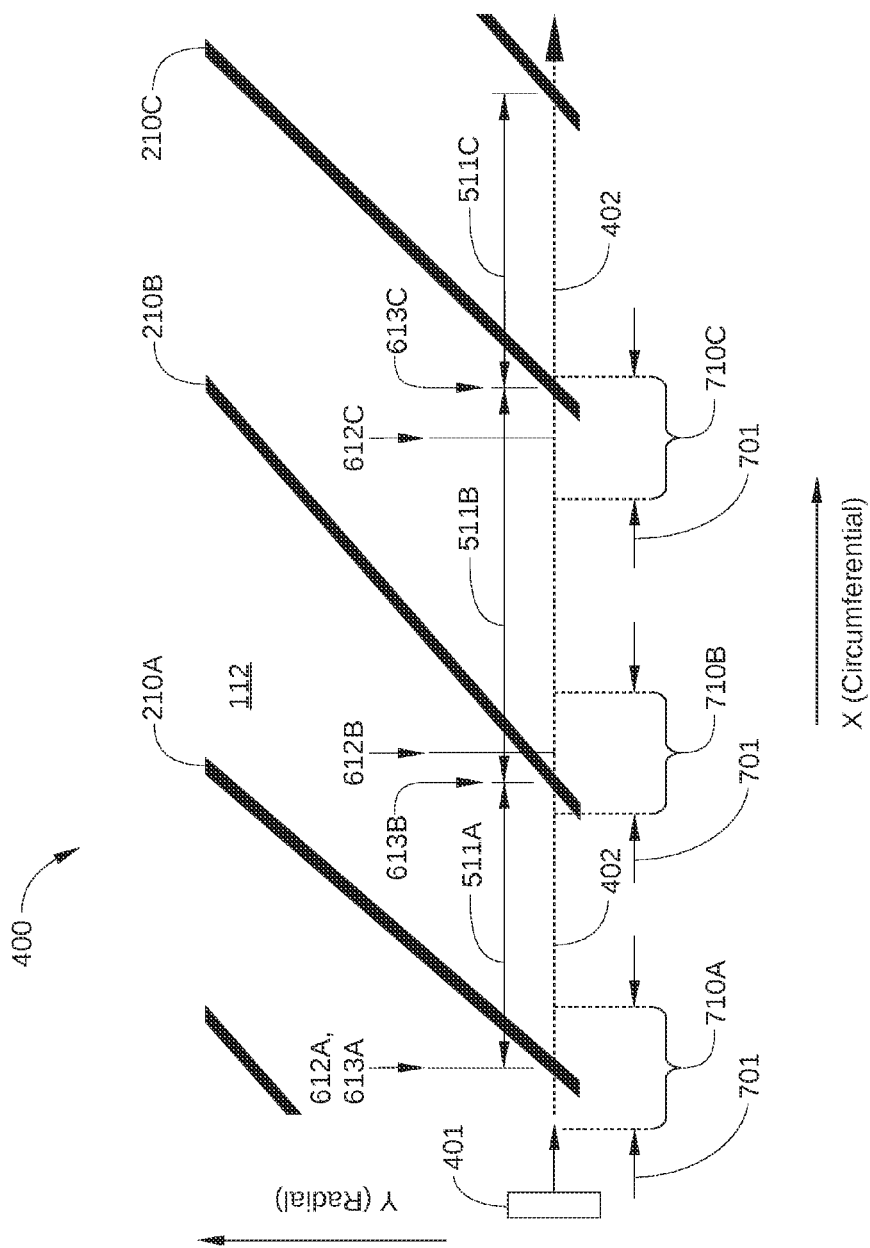
FIG. 7 is a schematic illustration of a portion of a storage disk prior to undergoing an SSW process and virtual demodulation windows used in the SSW process, according to an embodiment.

FIG. 7 is a schematic illustration of portion 400 of storage disk 110 prior to undergoing an SSW process and virtual demodulation windows 710A-710C used in the SSW process, according to an embodiment. Similar to FIGS. 5 and 6, reference spirals 210A-210C are not ideally formed, and therefore at radial location 402 are separated from each other by non-ideal circumferential distances 511A-511C. For reference, ideal spiral locations 612A-612C and actual spiral locations 613A-613C are also shown in FIG. 7. Each of virtual demodulation windows 710A-710C graphically depicts a time interval 701 during which read/write channel 137 of HDD 100 attempts to detect spiral crossings based on signals generated by read element 401. As set forth above in conjunction with FIG. 3, the duration of virtual windows employed in virtual window demodulation mode are not limited by the size of high-speed RAM 139, and can instead be of arbitrary length. Thus, even though actual spiral locations 613A-613C are not known, the duration of time interval 701 for each of virtual demodulation windows 710A-710C can be selected to ensure that spiral detection is enabled while read element 401 passes over the servo spiral associated with the virtual demodulation window, thereby preventing most or all spiral mis-detections during an SSW process. In some embodiments, time interval 701 is on the order of 100 to 300 frames.

Figure 8:
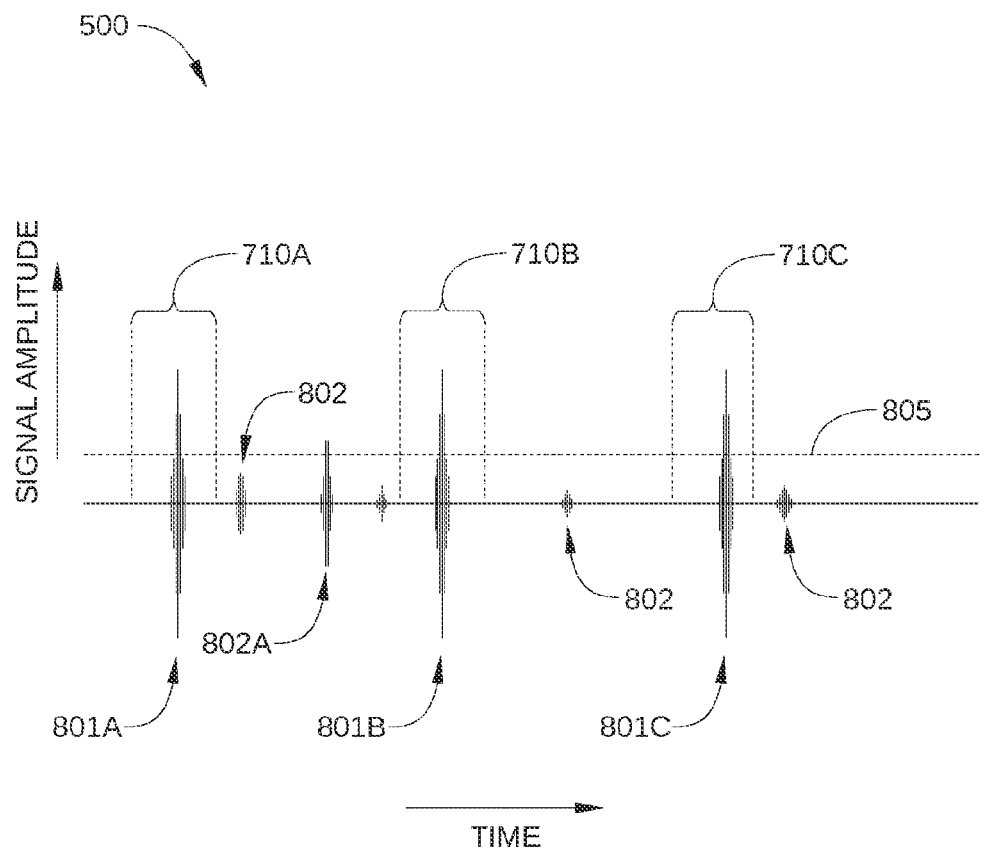
FIG. 8 is a timing diagram illustrating the timing of the virtual windows of FIG. 7 for spiral detection during a self-servo write process, according to one embodiment.

FIG. 8 is a timing diagram 800 illustrating the timing of virtual windows 710A-710C for spiral detection during an SSW, according to one embodiment. Also shown are spiral crossing signals 801A-801C and stray signals 802. Spiral crossing signals 801A-801C are generated by read/write head 127 as a read element thereof crosses servo spirals 210A-210C, respectively, which are shown in FIGS. 4-7. Stray signals 802 are generated by read/write head 127 as the read element of read/write head 127 crosses media defects, or, in the case of a reworked storage disk, previously written but incompletely erased signals.

As shown, spiral crossing signals 801A-801C fall well within virtual windows 710A-710C. Also shown is a signal amplitude threshold 805, which is a detection amplitude threshold that may be used during an SSW process indicating at what amplitude signals detected by read/write head 127 initiate the detection of a spiral crossing. When signals detected by read/write head 127 have an amplitude that is lower than signal amplitude threshold 805, read/write channel 137 does not send data generated from such signals to servo controller 138. When signals detected by read/write head 127 have an amplitude that exceeds signal amplitude threshold 805, read/write channel 137 sends data generated from such signals to servo controller 138. Occasionally, stray signals 802 may have a signal amplitude that exceeds signal amplitude threshold 805, such as high-amplitude stray signal 802A. However, because spiral detection is disabled in virtual window mode except during virtual windows 710A-710C, high-amplitude stray signal 802A must be detected during one of virtual windows 710A-710C to be erroneously interpreted as one of spiral crossing signals 801A-801C.

In some embodiments, virtual windows 710A-710C are implemented by disabling spiral detection for the appropriate time. Therefore, when read/write channel 137 generates data as a result of read/write head 127 passing over stray signals 802, the spiral search algorithm for the servo system of HDD 100 does not interpret such signals as a spiral crossing, even though stray signals 802 may have a signal amplitude that exceeds signal amplitude threshold 805. In some embodiments, spiral detection is disabled by increasing signal amplitude threshold 805 to a significantly higher value when read/write head is located between virtual windows 710A-710C, so that the presence of stray signals 802 cannot be interpreted by read/write channel 137 as a spiral crossing. One such embodiment is illustrated in FIG. 9.

Figure 9:
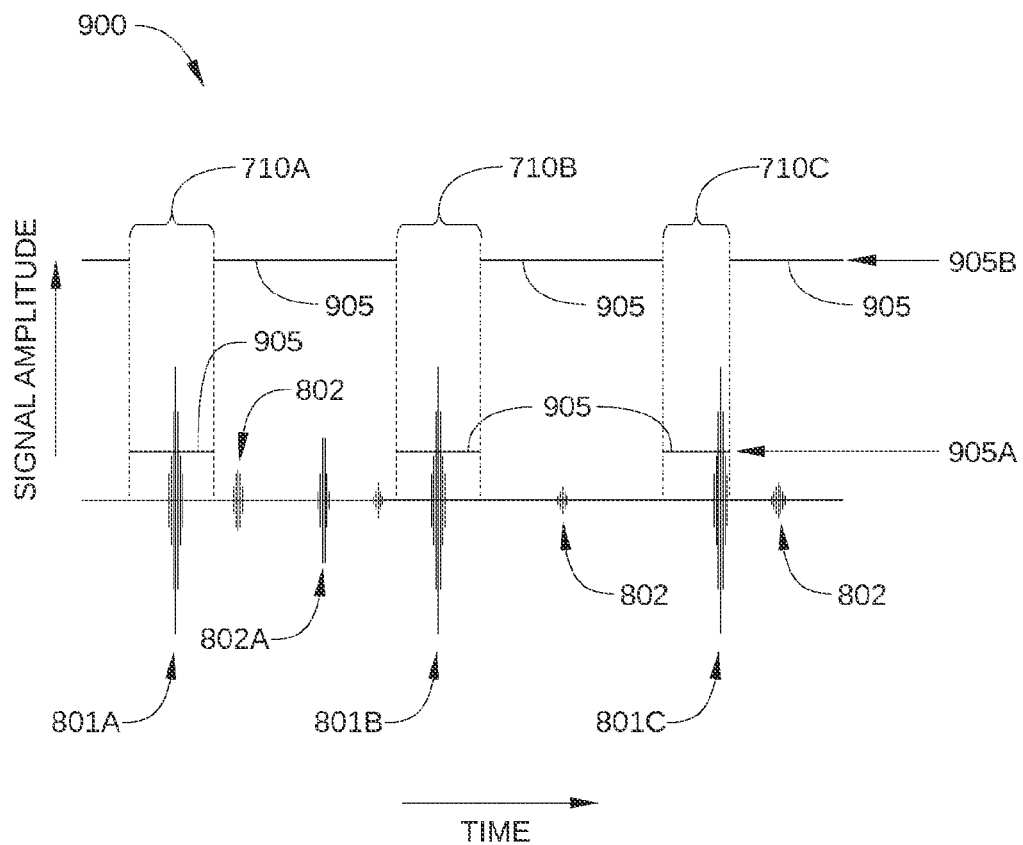
FIG. 9 is a timing diagram illustrating the timing of virtual windows for spiral detection and the changing value for a detection amplitude threshold during a self-servo write process, according to one embodiment.

FIG. 9 is a timing diagram 900 illustrating the timing of virtual windows 710A-710C for spiral detection and the changing value for a signal amplitude threshold 905 during an SSW process, according to one embodiment. As described above, to implement virtual windows 710A-710C in this embodiment, the value of signal amplitude threshold 905 is switched between an operational value 905A and a disabling value 905B. Thus, at a time when one of virtual windows 710A-710C should be opened and spiral detection enabled, the value of signal amplitude threshold 905 is set to operational value 905A, so that spiral crossing signals 801A-801C can be detected and the position of read/write head 127 determined by servo controller 138. Conversely, at a time when none of virtual windows 710A-710C should be opened and spiral detection disabled, the value of signal amplitude threshold 905 is set to disabling value 905B, so that no signals can be detected and high-amplitude stray signal 802A cannot be interpreted as a servo crossing by read/write channel 137.

In some embodiments, a virtual window may be closed in response to determining that read/write head 127 has crossed the spiral associated with the virtual window. In such embodiments, signal amplitude threshold 905 is returned to disabling value 905B as soon as read/write channel 137 detects a spiral crossing, as illustrated at virtual window 710C. As shown, signal amplitude threshold 905 is increased to disabling value 905B and virtual window 710C is closed as soon as spiral crossing signal 801C is detected. In such embodiments, signal amplitude threshold 905 is not decreased to operational 905A until the next virtual window is to be opened. In such embodiments, the potential for high-amplitude stray signal 802A occurring within virtual window 710C is reduced. In some embodiments, signal amplitude threshold 905 is a set point in firmware associated with the servo system of HDD 100. In some embodiments, such firmware is associated with logic included in read/write channel 137. Alternatively, such firmware may be associated with logic included in servo controller 138.

In some embodiments, spiral detection is disabled during virtual windows 710A-710C by disabling an interrupt service routine associated with spiral detection, and spiral detection is enabled outside virtual windows 710A-710C by enabling the interrupt service routine. In such embodiments, when read/write head 127 generates any signal during one of virtual windows 710A-710C, the interrupt service routine for performing spiral detection is not executed, regardless of the signal amplitude of such signals. Consequently, during virtual windows 710A-710C stray signals 802 cannot be interpreted by read/write channel 137 as a servo crossing. In some embodiments, the above-described interrupt service routine for spiral detection is enabled and disabled via the value of an interrupt flag or interrupt disable bit. One such embodiment is illustrated in FIG. 10.

Figure 10:
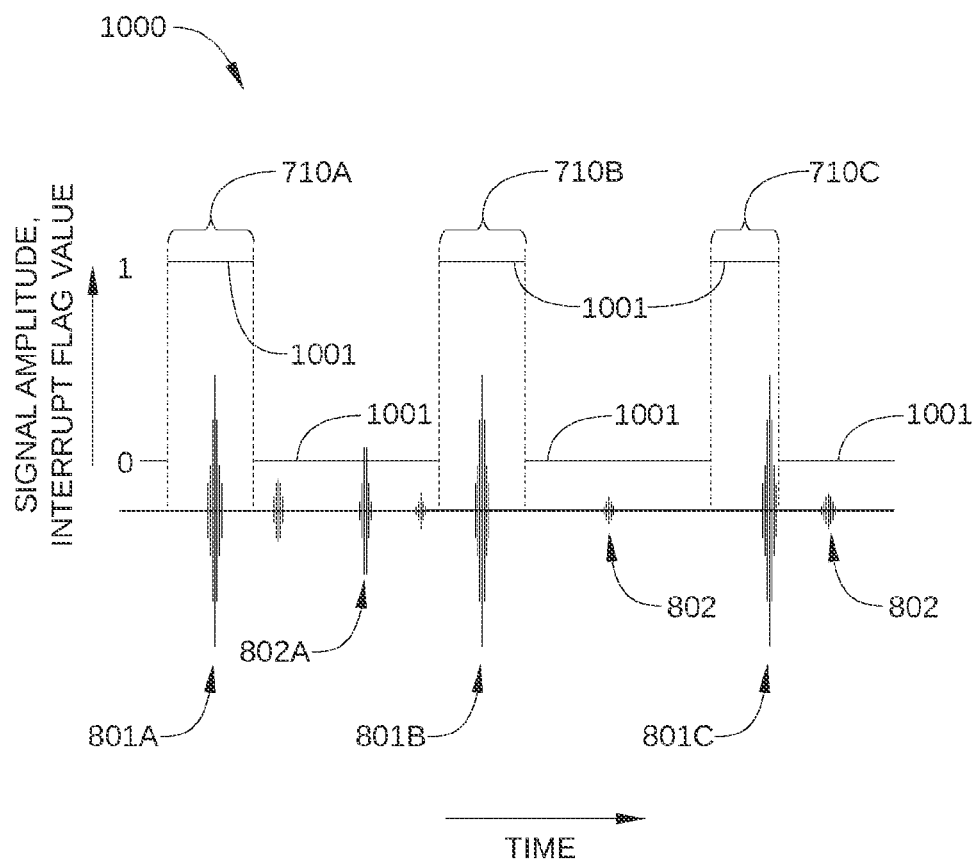
FIG. 10 is a timing diagram illustrating the timing of virtual windows for spiral detection and the changing value of an interrupt disable bit during a self-servo write process, according to one embodiment.

FIG. 10 is a timing diagram 1000 illustrating the timing of virtual windows 710A-710C for spiral detection and a changing value 1001 of an interrupt disable bit during an SSW process, according to one embodiment. As described above, to implement virtual windows 710A-710C in this embodiment, value 1001 of an interrupt disable bit is switched between 1 and 0 at appropriate times. Thus, at a time when one of virtual windows 710A-710C should be opened and spiral detection is enabled, value 1001 of the interrupt disable bit is set to a value, e.g., 1, that allows an interrupt service routine associated with spiral detection to be executed. Therefore, spiral crossing signals 801A-801C can be detected and the position of read/write head 127 determined by servo controller 138. Conversely, at a time when none of virtual windows 710A-710C should be opened and spiral detection is disabled, the value of the interrupt disable bit is set to a value, e.g., 0, that does not allow an interrupt service routine associated with spiral detection to be executed. Therefore, no spiral detection can take place, and high-amplitude stray signal 802A cannot be interpreted as a servo crossing by read/write channel 137.

In some embodiments, the above-described interrupt disable bit is a set point in firmware associated with the servo system of HDD 100. In some embodiments, such firmware is associated with logic included in read/write channel 137. Alternatively, such firmware may be associated with logic included in servo controller 138.

In some embodiments, a virtual window may be closed in response to determining that read/write head 127 has crossed the spiral associated with the virtual window, as illustrated at virtual window 710C. In such embodiments, as soon as spiral crossing signal 801C is detected, value 1001 is returned to the value, e.g., 0, that does not allow an interrupt service routine associated with spiral detection to be executed. In such embodiments, value 1001 of the interrupt disable bit is not set to 1 until the next virtual window is to be opened. As noted above, the potential for high-amplitude stray signal 802A occurring within virtual window 710C is reduced when a virtual window is closed in response to determining that read/write head 127 has crossed the spiral associated with the virtual window.

Figure 11:
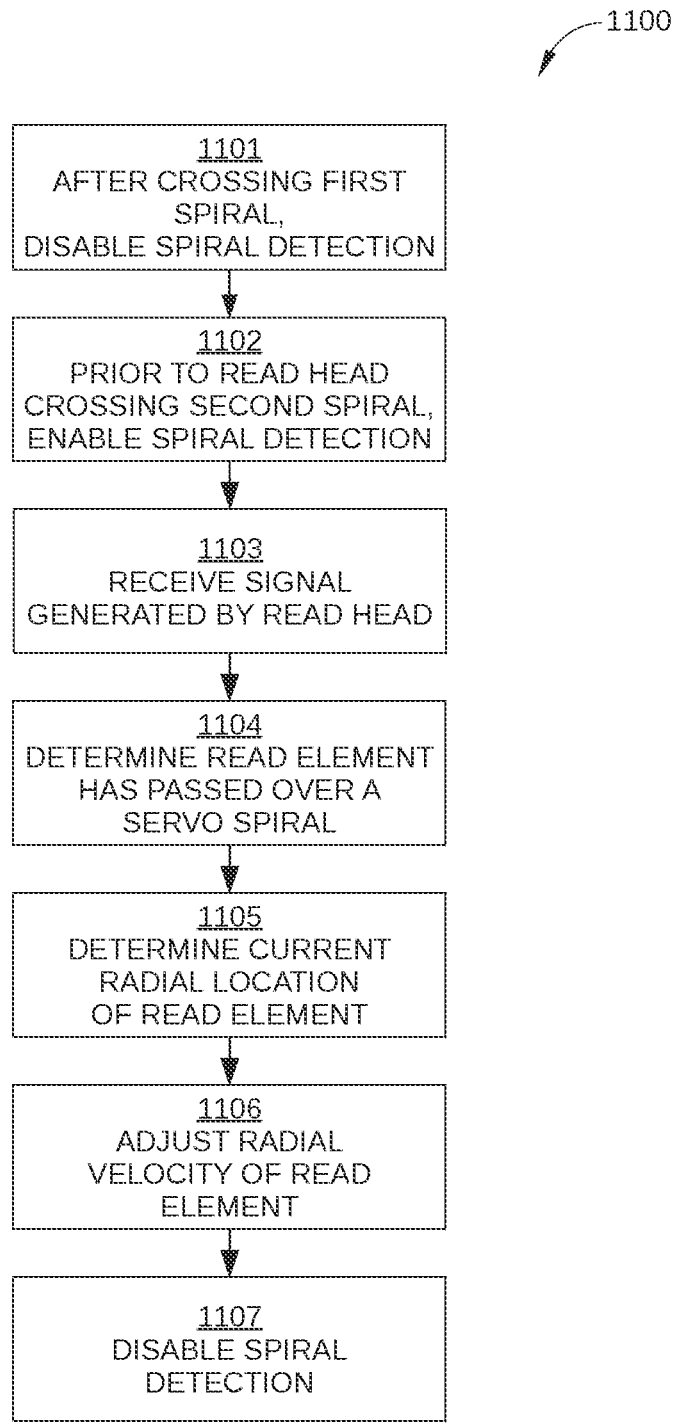
FIG. 11 sets forth a flowchart of method steps for positioning a write head over a storage disk based on position signals generated by a read head during an SSW process, according to an embodiment.

FIG. 11 sets forth a flowchart of method steps for positioning a write head over a storage disk based on position signals generated by a read head during an SSW process, according to an embodiment. Although the method steps are described in conjunction with HDD 100 in FIGS. 1-10, persons skilled in the art will understand that the method steps may be performed with other types of systems. The control algorithms for the method steps according to the embodiment may reside in processor 133, the servo control system for HDD 100 (such as read/write channel 137 and/or servo controller 138), or an external host device. For clarity of description, the servo control system of HDD 100 is described as performing said control algorithms for method 1100.

As shown, method 1100 begins at step 1101, when the servo control system disables spiral detection at a point in time after read element 401 crosses a first spiral formed on storage disk 110 and prior to read element 401 crossing a second spiral formed on storage disk 110. Generally, the second spiral is adjacent to the first spiral, therefore spiral detection is disabled when read element 401 is disposed between the first and second spirals. In some embodiments, spiral detection is disabled by increasing a signal threshold associated with initiating demodulation of a signal generated by read element 401. For example, the value of signal amplitude threshold 905 is switched from operational value 905A to disabling value 905B, as illustrated in FIG. 9. In other embodiments, spiral detection is disabled by setting value 1001 of an interrupt disable bit to a value that does not allow an interrupt service routine associated with spiral detection to be executed, as illustrated in FIG. 10.

In step 1102, the servo control system enables spiral detection prior to the read head crossing the second spiral. In some embodiments, spiral detection is enabled by decreasing a signal threshold associated with initiating demodulation of a signal generated by read element 401. For example, the value of signal amplitude threshold 905 is switched from disabling value 905B to operational value 905A. In other embodiments, spiral detection is enabled by setting value 1001 of an interrupt disable bit to a value that allows an interrupt service routine associated with spiral detection to be executed.

In some embodiments, a time for enabling the spiral detection in step 1102 is determined based on a time at which read element 401 crosses the first spiral. Given a particular radial location, rotational velocity of storage disk 110, nominal location of the first and second spirals, and the time at which read element 401 crosses the first spiral, such a determination can be readily performed by the servo control system using conventional control algorithms. Because virtual windows 710A-710C, as described herein, can be open for an arbitrary time interval, the duration of virtual windows 710A-710C can be selected to ensure that spiral detection is enabled in step 1102 prior to read element 401 crossing the second spiral, even when there is significant uncertainty in the actual location of the second spiral.

In step 1103, the servo control system receives signals generated by read element 401 as read element 401 passes over the second spiral. In step 1104, the servo control system determines that the received signals are generated by read element 401 passing over a servo spiral. Any suitable algorithm may be employed for such a determination. In step 1105, in response to the determination that read element 401 has passed over a servo spiral, the servo control system demodulates the received signals to determine a current radial location of read element 401. In step 1106, the servo control system adjusts the radial velocity of the write element based on the radial position of read element 401 determined in step 1105.

In step 1107, after read element 401 has crossed the second spiral, the servo control system disables spiral detection. In some embodiments, spiral detection is disabled by increasing a signal threshold associated with initiating demodulation of a signal generated by read element 401, and in other embodiments, spiral detection is disabled by setting value 1001 of an interrupt disable bit to a value that does not allow an interrupt service routine associated with spiral detection to be executed. In some embodiments, step 1106 may be performed prior to or simultaneously with step 1105.

Figure 12:
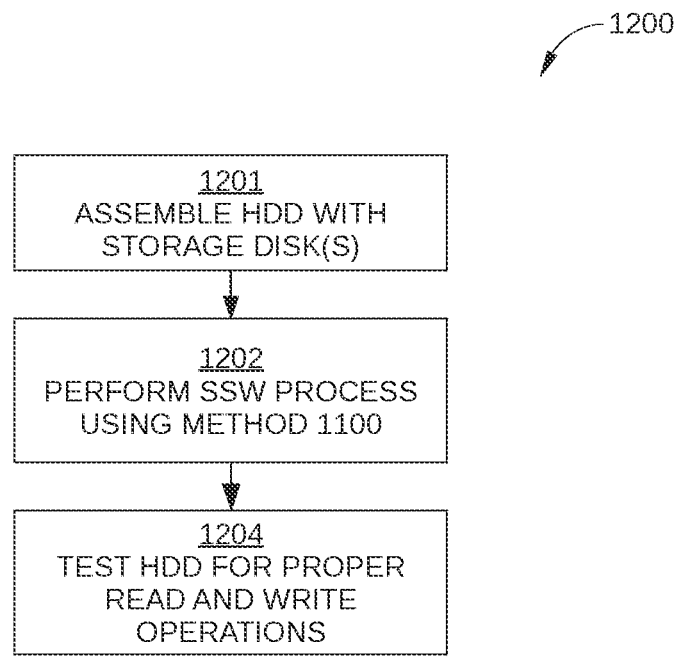
FIG. 12 sets forth a flowchart of method steps for manufacturing a hard disk drive, according to an embodiment.

FIG. 12 sets forth a flowchart of method steps for manufacturing HDD 100, according to an embodiment. Although the method steps are described in conjunction with HDD 100 in FIGS. 1-11, persons skilled in the art will understand that the method steps may also be performed for manufacturing other types of hard disk drives.

As shown, a method 1200 begins at step 1201, where HDD 100 is assembled, including the incorporation of multiple storage disks 110 in the housing of HDD 100. In step 1202, an SSW process is performed by assembled HDD 100. Specifically, reference spirals 210 are written on one or more surfaces of storage disk(s) 110. Servo wedges are then written on the storage surfaces of storage disks 110 while the servo system of HDD 100 uses closed-loop tracking of the reference spirals. During the closed-loop tracking of the reference spirals, a magnetic head of HDD 100 is positioned using method 1100, as set for the above. In step 1203, HDD 100 is tested for proper writing and reading operations.

In sum, embodiments herein provide systems and methods for positioning a write head during an SSW process in a hard disk drive. A virtual window mode is employed for positioning the write head, in which the read channel of the hard disk drive continuously searches for servo spirals, but spiral detection is disabled except during the virtual windows. Each virtual window is associated with one specific servo spiral on the disk surface, and has a predetermined duration. The duration and timing of these virtual windows may be selected to ensure that spiral detection is enabled while a read head of the hard disk drive passes over the associated servo spiral, even when servo spiral placement is not ideal. Since spiral detection is only enabled in the vicinity of the predicted location of each servo spiral, stray signals on the disk surface are much less likely to be falsely interpreted by the read channel as a servo spiral.

While the foregoing is directed to embodiments of the present invention, other and further embodiments of the invention may be devised without departing from the basic scope thereof, and the scope thereof is determined by the claims that follow.

We claim:

1. A method of positioning a write head based on position signals generated from signals read by a read head as the read head crosses a plurality of reference spirals, including first and second spirals that are adjacent, the method comprising:

after the read head crosses the first spiral and prior to the read head crossing the second spiral, disabling spiral detection;

after disabling the spiral detection and prior to the read head crossing the second spiral, enabling the spiral detection;

while the spiral detection is enabled, determining that the read head has crossed the second spiral based on a position signal generated from signals read by the read head, and responsive to the determining, demodulating the position signal to determine a radial position of the write head;

disabling spiral detection after a predetermined time period has elapsed since the determination that the read head has crossed the second spiral; and based on the determined radial position, adjusting a radial velocity of the write head.

2. The method of claim 1, further comprising:
while the spiral detection is enabled:
receiving signals generated by the read head;
determining that the received signals are generated by the read head passing over one of the plurality of reference spirals; and
in response to the determining, demodulating the received signals to determine a current radial location of the read head.

3. The method of claim 2, further comprising storing the signals generated by the read head in a rotating buffer.

4. The method of claim 3, further comprising transmitting data stored in the rotating buffer to a servo control circuit.

5. The method of claim 1, wherein disabling the spiral detection comprises increasing a signal threshold associated with initiating demodulation of a signal generated by the read head, and enabling the spiral detection comprises decreasing the signal threshold.

6. The method of claim 1, wherein disabling the spiral detection comprises setting a flag to a first value that disables an interrupt service routine associated with demodulating a signal generated by the read head, and wherein enabling the spiral detection comprises setting the flag to a second value that enables the interrupt service routine.

7. The method of claim 1, further comprising, prior to the read head crossing the second spiral and prior to enabling the spiral detection, determining a time for enabling the spiral detection based on a time at which the read head crosses the first spiral.

8. The method of claim 1, wherein disabling the spiral detection after the read head crosses the second spiral comprises disabling the spiral detection at the end of a time interval of a predetermined duration that starts when the spiral detection is enabled.

9. The method of claim 8, wherein the start of the time interval is determined based on a time at which the read head crosses the first spiral.

10. The method of claim 9, wherein the predetermined duration of the time interval is selected so that the read head crosses the second spiral during the time interval.

11. A data storage device comprising:
a rotatable disk with a writable surface; and
a controller configured to position a write head based on position signals generated by signals read by a read head as the read head crosses a plurality of reference spirals, including first and second spirals that are adjacent by:

after the read head crosses the first spiral and prior to the read head crossing the second spiral, disabling spiral detection;

after disabling the spiral detection and prior to the read head crossing the second spiral, enabling the spiral detection;

while the spiral detection is enabled, determining that the read head has crossed the second spiral based on a position signal generated from signals read by the read head, and responsive to the determining, demodulating the position signal to determine a radial position of the write head;

disabling spiral detection after a predetermined time period has elapsed since the determination that the read head has crossed the second spiral; and based on the determined radial position, adjusting a radial velocity of the write head.

12. The data storage device of claim 11, wherein the controller is further configured to:
while the spiral detection is enabled:
receive signals generated by the read head;
determine that the received signals are generated by the read head passing over one of the plurality of reference spirals; and
in response to determining that the received signals are generated by the read head, demodulate the received signals to determine a current radial location of the read head.

13. The data storage device of claim 11, wherein disabling the spiral detection after the read head crosses the second spiral comprises disabling the spiral detection at the end of a time interval of a predetermined duration that starts when the spiral detection is enabled.

14. A method of manufacturing a hard disk drive, the method comprising:
incorporating a storage disk in a housing of the hard disk drive;
forming a plurality of reference spirals, including first and second spirals that are adjacent, on a surface of the storage disk; and
positioning a write head based on position signals generated from signals read by a read head as the read head crosses the plurality of reference spirals by:

after the read head crosses the first spiral and prior to the read head crossing the second spiral, disabling spiral detection;

after disabling the spiral detection and prior to the read head crossing the second spiral, enabling the spiral detection;

while the spiral detection is enabled, determining that the read head has crossed the second spiral based on a position signal generated from signals read by the read head, and responsive to the determining, demodulating the position signal to determine a radial position of the write head;

disabling spiral detection after a predetermined time period has elapsed since the determination that the read head has crossed the second spiral; and based on the determined radial position, adjusting a radial velocity of the write head.

15. The method of claim 14, further comprising:
while the spiral detection is enabled:
receiving signals generated by the read head;
determining that the received signals are generated by the read head passing over one of the plurality of reference spirals; and in response to the determining, demodulating the received signals to determine a current radial location of the read head.

16. The method of claim 14, wherein disabling the spiral detection comprises increasing a signal threshold associated with initiating demodulation of a signal generated by the read head, and enabling the spiral detection comprises decreasing the signal threshold.

17. The method of claim 14, wherein disabling the spiral detection comprises setting a flag to a first value that disables an interrupt service routine associated with demodulating a signal generated by the read head, and wherein enabling the spiral detection comprises setting the flag to a second value that enables the interrupt service routine.

18. The method of claim 14, further comprising, prior to the read head crossing the second spiral and prior to enabling the spiral detection, determining a time for enabling the spiral detection based on a time at which the read head crosses the first spiral.

* * * * *